No. 863,751. PATENTED AUG. 20, 1907.
W. R. PELTON.
MACHINE FOR MAKING BATS.
APPLICATION FILED OCT. 23, 1906.
3 SHEETS—SHEET 1.
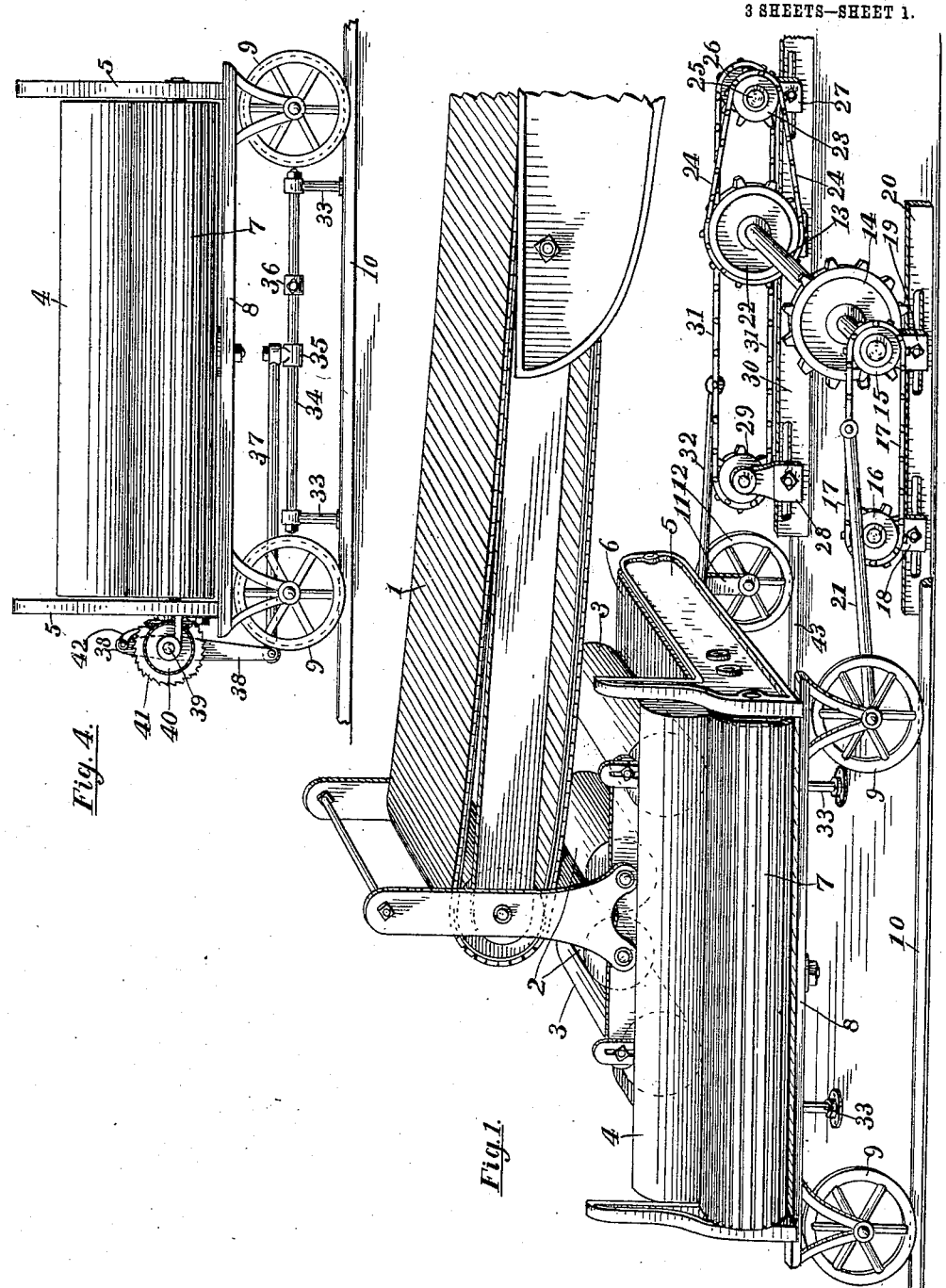
Witnesses
Georgiana Chace
Palmer A. Jones.
Inventor
William R. Pelton
By Luther V. Moulton
Attorney No. 863,751. PATENTED AUG. 20, 1907.
W. R. PELTON.
MACHINE FOR MAKING BATS.
APPLICATION FILED OCT. 23, 1906.

3 SHEETS—SHEET 2.

Witnesses
Georgiana Chace
Palmer A. Jones.

Inventor
William R Pelton
By Luther V. Mailton
Attorney

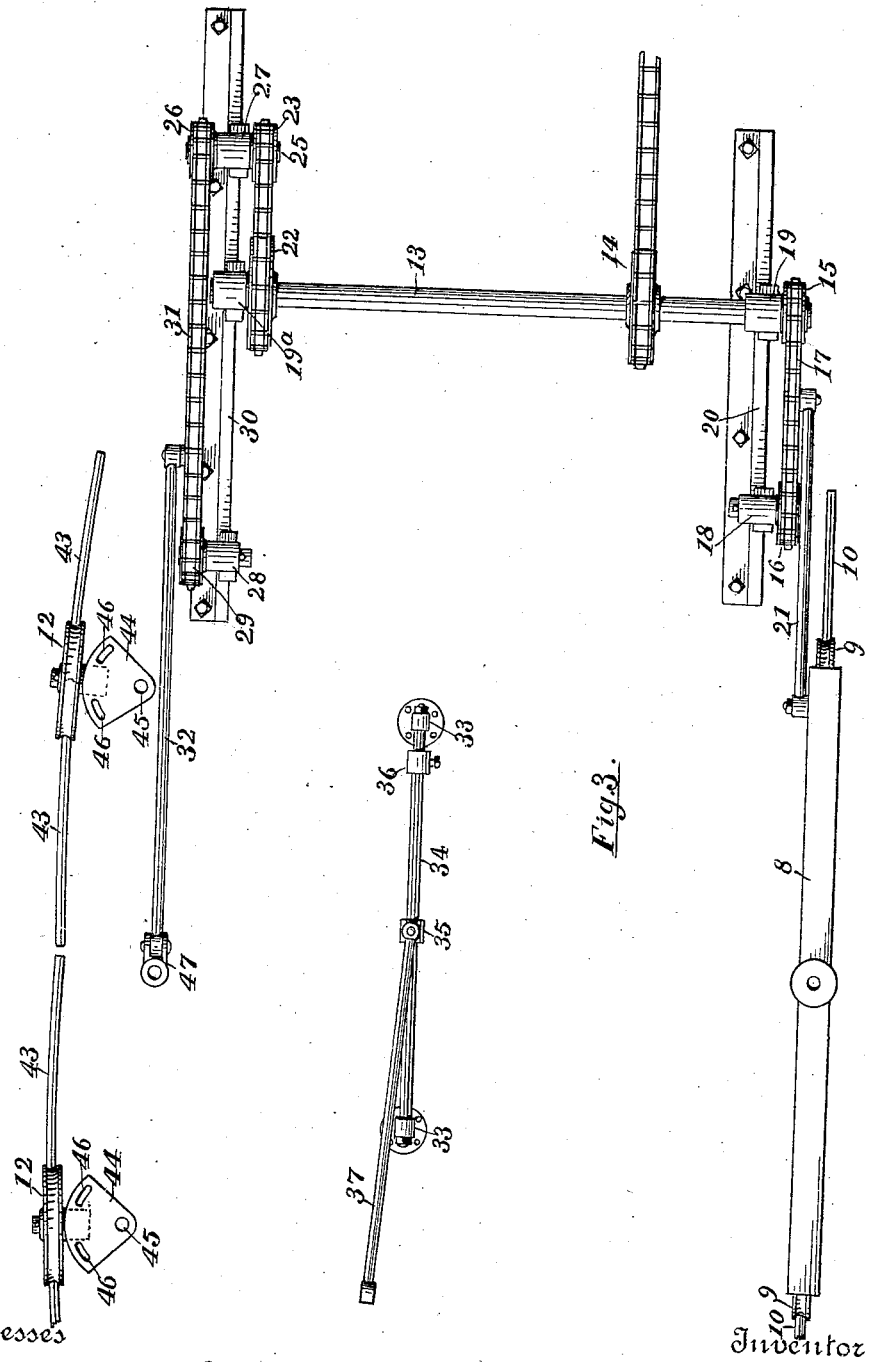

UNITED STATES PATENT OFFICE.

WILLIAM R. PELTON, OF GRAND RAPIDS, MICHIGAN.

MACHINE FOR MAKING BATS.

No. 863,751.  Specification of Letters Patent.  Patented Aug. 20, 1907.

Application filed October 23, 1906. Serial No. 340,182.

*To all whom it may concern:*

Be it known that I, WILLIAM R. PELTON, a citizen of the United States of America, residing at Grand Rapids, in the county of Kent and State of Michigan, have invented certain new and useful Improvements in Machines for Making Bats; and I do hereby declare the following to be a full, clear, and exact description of the invention, such as will enable others skilled in the art to which it appertains to make and use the same.

My invention relates to improvements in machines for making bats, and more particularly to machines for making the bats used in the manufacture of felt boots or other tubular structures of felt. Heretofore such bats have been made of substantially uniform thickness throughout and with substantially square edges, and these edges afterward beveled by manually removing portions of the material before joining the said edges to form a tubular structure. These manually prepared edges are necessarily more or less uneven and rough at best, and require care in preparation.

The object of my invention is to provide a machine adapted to produce a bat having beveled edges adapted to be overlapped and joined by the felting process without any further preparation; to save labor and expense; to produce better and evener edges and to provide the device with various novel and useful features hereinafter more fully described and particularly pointed out in the claims.

Figure 5:
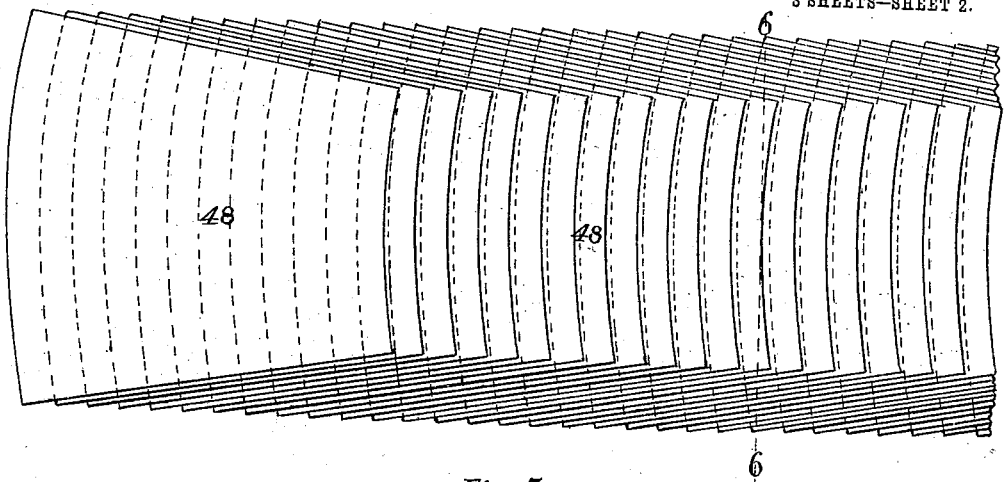
Figure 6:
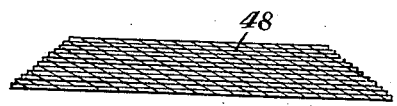
Figure 2:
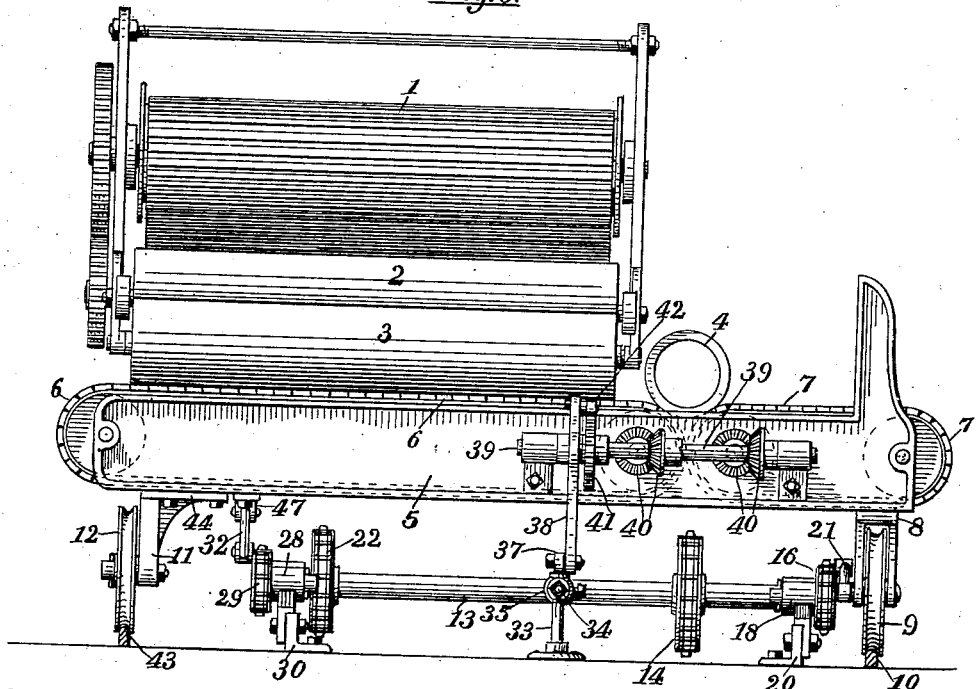

My invention consists essentially of novel means whereby the reciprocating carriage of a bat forming machine as commonly used is inclined to the axis of the rolls that feed the web thereto at the termination of the movement of said carriage, whereby the edge of each layer of material forming the bat is inclined to the edge of the bat as a whole, which layers when otherwise superposed as usual will form bats having regular and smoothly beveled edges, the middle portion of the bat between these beveled edges having substantially uniform thickness. A form of such device is shown in the accompanying drawings, in which:

Figure 1. is a perspective of a device embodying my invention; Fig. 2. an elevation of the same; Fig. 3. a plan view of the mechanism beneath the carriage for operating the same; Fig. 4. an end view of the carriage and showing the take-up mechanism; Fig. 5. a diagram in plan view showing the formation of the bat; and, Fig. 6. the same in cross section on the line 6—6 of Fig. 5.

Like numbers refer to like parts in all of the figures.

1 represents the apron of a carding machine which delivers a thin loose web of wool or other like material to a pair of feed rolls 2, which serve to deposit the web upon the carriage 5.

3 are auxiliary rolls below the plane of the rolls 2, to roll this web down upon the apron 6 on the carriage 5. This apron traverses longitudinally of the rolls 2 and 3, being given a step by step movement by mechanism hereinafter described. 7 is another apron on the carriage 5 having a like and simultaneous movement to the apron 6, and between these aprons 6 and 7 is a roll 4 arranged transversely of the carriage to further compress the bat as it is carried beneath the same by the aprons 6 and 7.

So far the device is the same as is commonly used to make a bat having substantially uniform thickness throughout from edge to edge, for which purpose the carriage 5 has heretofore been given a reciprocating movement under the rolls 2 and 3 of equal extent at its respective ends, and whereby the carriage is parallel with the axis of said rolls at all times, and the aprons 6 and 7 given a step by step movement under the rolls 2, 3, and 4, whereby each layer of the web is laid with its edge in line with the edge of the bat and partially overlaps the layer beneath and partially extends beyond the same, thus forming a continuous bat of equal thickness throughout from edge to edge.

The novelty of my improved machine consists particularly in means for imparting to the carriage 5 a movement whereby the respective layers of the web are laid with the edge of each respective layer inclined to the edge of the bat and further in the improved means for imparting the step by step movement of the aprons 6 and 7.

The form shown consists essentially of the following mechanism, to-wit: One end of the carriage 5 is mounted on a bolster 8 pivoted to the carriage at the middle and supported by wheels 9 moving upon a straight track 10. The other end of the carriage is given a reciprocating movement about this pivot to accommodate the excess of travel and is carried upon curved tracks 43 by means of wheels 12 journaled in hangers 11 adjustable to conform to the direction of these tracks by means of segment plates 44 pivoted to the carriage at 45 and provided with concentric adjusting slots 46, through which slots cap screws are inserted to hold the segments in place.

The carriage is simultaneously reciprocated at its respective ends throughout a greater distance at one end than the other, so that at the end of each movement it is inclined to the axis of the feed rolls 2—2 by the following means: A driving shaft 13 is provided, having a wheel 14 connected to any convenient means for giving this shaft a constant motion at the proper speed. On one end of this shaft is a sprocket wheel 15 and spaced therefrom a proper distance to give the desired length to the chain 17 is another similar wheel 16. These wheels 15 and 16 are connected by a sprocket chain 17 to which is attached one end of a pitman 21, the other end of the same being attached to the front end of the carriage preferably to one of the hangers on which one of the wheels 9 is mounted. On the shaft 13 is a sprocket wheel 22, the pitch diameter of which is as much greater than the pitch diameter of the wheel 15 as the movement of the rear end of the carriage 5 is greater than that of the front end of the same. This wheel is connected by a chain 24 to a sprocket wheel 23 mounted on a countershaft 25 on which is a similar wheel 26. From this wheel extends a chain 31 to a similar wheel 29, this chain 31 being of as much greater length than the chain 17, as the pitch diameter of the wheel 22 is greater than that of the wheel 15. Thus the respective chains 17 and 31 will make a complete revolution in the same time.

A pitman 32 connects the chain 31 and the rear of the carriage 5. Thus at each revolution of these respective chains, the carriage is reciprocated at one end to a less degree than at the other end, which results in laying a segment-shaped layer of the web upon the apron 6 with its wider end toward the end of the carriage having the greatest movement, and each edge inclined to the respective edge of the bat.

My improved take-up mechanism by which the aprons 6 and 7 are given a step by step movement at each reciprocation of the carriage, in the form shown consists, of a rod 34 arranged transversely of the carriage and beneath the same and supported by posts 33. On this rod is a slide 35 connected by a pitman 37 to a pendulum lever 38 journaled on a shaft 39 mounted on the carriage and connected by miter gears 40 to the driving rolls of the respective aprons 6 and 7. This shaft is given a step by step rotary movement by means of a ratchet wheel 41 fixed on the shaft and engaged by a pawl 42 on the lever 38. As the carriage moves out the slide 35 engages the post 33 and swings the lever under the carriage to move the pawl 42 backward on the ratchet 41. As the carriage moves inward, the slide 35 engages the adjustable collar 36 on the rod 34, and thus the lever 38 is moved outward and shifts the aprons 6 and 7 substantially at or near the termination of the movement of the carriage.

By adjusting the collar 36, the movement of the aprons 6 and 7 may be made more or less at pleasure. To adjust or change the carriage movement, the hangers 27, 28, 18, 19 and 19ª are all mounted on the angle bars 20 and 30 and made adjustable thereon by means of elongated openings in the bars through which openings and the hangers extend clamping bolts to adjustably secure the hangers in place. By adjusting the respective lengths of the chains 17 and 31 and changing the wheel 22 to correspond, the difference in width of the respective ends of the segmental layers of the web can be varied, and by adjusting the hangers 27 and 28 so that the rear end swings a greater distance at one side of a line parallel with the rolls 2 and 3 than at the other, the bevel at the respective edges of the bat may be made to differ, if so desired.

What I claim is:

1. In a bat forming machine, the combination of a reciprocating carriage, feed rolls to deposit a web upon the carriage, and means for moving the carriage out of alinement with the axis of the feed rolls at the termination of its movement, whereby the edge of each layer of the web is deposited at an inclination to the edge of the bat, and a beveled edge thus formed on the bat.

2. In a bat forming machine, the combination of a reciprocating carriage, an apron movable longitudinally of the carriage, means for moving the apron, feed rolls to deposit a web on said apron, and means for adjusting the carriage out of alinement with the feed rolls, whereby the edge of each layer of the web is inclined to the edge of the bat to form a beveled edge on the bat.

3. In a bat forming machine, the combination of a reciprocating carriage, an apron movable longitudinally of the carriage, means for moving the apron, feed rolls to deposit a web on the apron, and means for imparting unequal reciprocating movement to the respective ends of the carriage, whereby the web is laid in segmental layers with the edge of each layer inclined to the edge of the bat, and beveled edges formed on the bat.

4. In a bat forming machine, a reciprocating carriage, an apron longitudinally movable on the carriage, means for moving the apron, means for depositing a web on said apron, a relatively short sprocket chain extending around two wheels, a rod connecting said chain and one end of the carriage, a relatively longer chain extending around two wheels, a rod connecting said chain and the other end of the carriage, and means for moving each chain a complete circuit in the same time.

5. A bat forming machine, comprising a reciprocating carriage, a bolster pivoted at the middle under one end of the carriage, wheels supporting the bolster and traversing a straight track, wheels supporting the other end of the carriage, curved tracks beneath said wheels and traversed thereby, sprocket chains of unequal length, rods connecting said chains to the respective ends of the carriage, and means for moving each chain its entire length in the same time.

6. In combination with the carriage of a bat forming machine, a driving shaft, means for rotating the same, a sprocket wheel on the shaft, a second sprocket wheel spaced apart therefrom, a chain connecting said wheels, a rod connecting said chain and one end of the carriage, a second sprocket chain of greater length than the first named chain, two sprocket wheels spaced apart and connected by said chain, a rod connecting the last named chain with the other end of the carriage, and means for driving the last named chain from the driving shaft.

7. In combination with the carriage of a bat forming machine, a driving shaft, means for rotating the same, two sprocket wheels of unequal pitch diameters on said shaft, a sprocket wheel spaced apart from the smaller wheel, a comparatively shorter chain connecting said wheels, a rod connecting said chain and one end of the carriage, a sprocket wheel connected to the larger wheel on the driving shaft and mounted on a countershaft, a second sprocket wheel on the counter-shaft, a sprocket wheel spaced apart therefrom, a comparatively longer chain connecting the two last named wheels, a rod connecting the last named chain with the other end of the carriage, and adjustable hangers supporting the last two mentioned sprocket wheels.

8. In a bat forming machine, a reciprocating carriage, an apron movable longitudinally of the carriage, rolls engaging the apron, a shaft mounted on the carriage, miter gears connecting the shaft and one of the rolls, a lever journaled on the shaft, a ratchet wheel on the shaft, a pawl on the lever and engaging the wheel, a fixed rod beneath the carriage, a slide and an adjustable collar on the rod, and a rod connecting the slide and the lever.

9. In a bat forming machine, a reciprocating carriage, an apron movable longitudinally of the carriage, rolls engaging the apron, a shaft journaled on the carriage, miter gears connecting the shaft and one of said rolls, a ratchet wheel on said shaft, a lever journaled on the shaft, a pawl on the lever and engaging the wheel, and means for reciprocating the lever at each reciprocation of the carriage.

In testimony whereof I affix my signature in presence of two witnesses.

WILLIAM R. PELTON.

Witnesses:
 LUTHER V. MOULTON,
 PALMER A. JONES.